US010269015B2

(12) United States Patent
Jackson et al.

(10) Patent No.: US 10,269,015 B2
(45) Date of Patent: *Apr. 23, 2019

(54) SECURE PAYMENT SERVICE AND SYSTEM FOR INTERACTIVE VOICE RESPONSE (IVR) SYSTEMS

(71) Applicant: AT&T INTELLECTUAL PROPERTY I, L.P., Atlanta, GA (US)

(72) Inventors: James Jackson, Austin, TX (US); Mehrad Yasrebi, Auston, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 234 days.

This patent is subject to a terminal disclaimer.

(21) Appl. No.: 15/061,227

(22) Filed: Mar. 4, 2016

(65) Prior Publication Data

US 2016/0180340 A1 Jun. 23, 2016

Related U.S. Application Data

(63) Continuation of application No. 14/297,658, filed on Jun. 6, 2014, now Pat. No. 9,311,630, which is a (Continued)

(51) Int. Cl.
*G06Q 20/40* (2012.01)
*G06Q 20/10* (2012.01)
(Continued)

(52) U.S. Cl.
CPC ....... *G06Q 20/401* (2013.01); *G06Q 20/0855* (2013.01); *G06Q 20/10* (2013.01);
(Continued)

(58) Field of Classification Search
CPC .. G06Q 10/02; G06Q 20/0855; G06Q 20/401; G06Q 20/32
(Continued)

(56) References Cited

U.S. PATENT DOCUMENTS 5,148,472 A 9/1992 Freese
5,668,876 A 9/1997 Falk
(Continued)

OTHER PUBLICATIONS

"Implementation Giudelines for Mobile Payments", European Committee for Banking Standards, IG606 V1, (Mar. 2005).
(Continued)

*Primary Examiner* — Gerald Gauthier
(74) *Attorney, Agent, or Firm* — Greenblum & Bernstein, P.L.C.

(57) ABSTRACT

A secure payment method includes receiving, by a payment recipient, a transaction request from a party in a transaction. The payment recipient requests a payment that is in a specified form and that is uniquely identified by a unique identification. The method includes receiving, on behalf of the payment recipient and at a payment recipient computer, the payment that is in the specified form. The payment is uniquely identified by the unique identification. The payment recipient authorizes the transaction in response to receiving the payment that is in the specified form and that is uniquely identified by the unique identification. The specified form is issued by a private third party.

20 Claims, 4 Drawing Sheets

Related U.S. Application Data continuation of application No. 13/307,982, filed on Nov. 30, 2011, now Pat. No. 8,781,957, which is a continuation of application No. 12/179,029, filed on Jul. 24, 2008, now Pat. No. 8,090,650.

(51) Int. Cl.

| | |
|---|---|
| *G06Q 20/12* | (2012.01) |
| *G06Q 20/20* | (2012.01) |
| *G06Q 20/36* | (2012.01) |
| *G06Q 50/12* | (2012.01) |
| *G06Q 20/08* | (2012.01) |
| *G06Q 20/42* | (2012.01) |
| *H04M 3/493* | (2006.01) |

(52) U.S. Cl.
CPC ............. *G06Q 20/12* (2013.01); *G06Q 20/20* (2013.01); *G06Q 20/3674* (2013.01); *G06Q 20/40* (2013.01); *G06Q 20/42* (2013.01); *G06Q 50/12* (2013.01); *G06Q 2220/00* (2013.01); *H04M 3/493* (2013.01)

(58) Field of Classification Search
USPC ...... 235/380, 382; 379/88.04; 705/17, 26.35, 705/39, 40, 44, 67, 75, 26.1, 64, 37, 50; 713/171
See application file for complete search history.

(56) References Cited

U.S. PATENT DOCUMENTS

| | | | |
|---|---|---|---|
| 5,787,151 A | 7/1998 | Nakatsu et al. | |
| 5,845,267 A | 12/1998 | Ronen | |
| 5,991,749 A | 11/1999 | Morrill, Jr. | |
| 6,047,268 A | 4/2000 | Bartoli et al. | |
| 6,236,981 B1 | 5/2001 | Hill | |
| 6,249,770 B1 | 6/2001 | Erwin et al. | |
| 6,424,706 B1 | 7/2002 | Katz et al. | |
| 6,487,540 B1 | 11/2002 | Smith et al. | |
| 6,529,885 B1* | 3/2003 | Johnson ................ | G06Q 20/04 |
| | | | 705/26.4 |
| 6,560,581 B1 | 5/2003 | Fox et al. | |
| 6,934,858 B2 | 8/2005 | Woodhill et al. | |
| 7,003,497 B2 | 2/2006 | Maes et al. | |
| 7,051,001 B1 | 5/2006 | Slater et al. | |
| 7,225,156 B2* | 5/2007 | Fisher ................... | G06Q 20/02 |
| | | | 235/379 |
| 7,249,266 B2 | 7/2007 | Margalit | |
| 7,328,190 B2 | 2/2008 | Smith et al. | |
| 7,461,010 B2 | 12/2008 | Kwan | |
| 7,527,195 B2 | 5/2009 | Keithley et al. | |
| 7,539,646 B2* | 5/2009 | Gilder ................... | G06Q 20/04 |
| | | | 705/40 |
| 7,555,460 B1 | 6/2009 | Barkan | |
| 7,630,926 B2 | 12/2009 | Chakiris et al. | |
| 7,647,404 B2 | 1/2010 | Cooper | |
| 7,685,020 B2 | 3/2010 | Do et al. | |
| 7,702,577 B1 | 4/2010 | Dickelman | |
| 7,716,129 B1 | 5/2010 | Tan et al. | |
| 7,729,984 B1 | 6/2010 | Nappi | |
| 7,734,527 B2* | 6/2010 | Uzo ....................... | G06Q 20/06 |
| | | | 235/383 |
| 7,748,621 B2 | 7/2010 | Gusler et al. | |
| 7,761,380 B2 | 7/2010 | Katz | |
| 7,774,231 B2 | 8/2010 | Pond et al. | |
| 7,783,579 B2 | 8/2010 | Gentry et al. | |
| 7,836,484 B2 | 11/2010 | Pardo-Blazquez | |
| 7,908,182 B1 | 3/2011 | Gupta | |
| 7,945,240 B1 | 5/2011 | Klock et al. | |
| 7,945,512 B2 | 5/2011 | Scipioni et al. | |
| 8,001,040 B2 | 8/2011 | Keithley | |
| 8,010,446 B2 | 8/2011 | Talbert et al. | |
| 8,010,451 B1 | 8/2011 | Nappi | |
| 8,037,158 B2 | 10/2011 | Arunachalam | |
| 8,065,291 B2 | 11/2011 | Knorr | |
| 8,090,650 B2* | 1/2012 | Jackson ................ | G06Q 20/10 |
| | | | 379/88.04 |
| 8,112,353 B2 | 2/2012 | Li | |
| 8,126,807 B2 | 2/2012 | Hawkins et al. | |
| 8,151,345 B1 | 4/2012 | Yeager | |
| 8,255,080 B2 | 8/2012 | Hirsh et al. | |
| 8,260,199 B2 | 9/2012 | Kowalski | |
| 8,271,339 B2 | 9/2012 | Arunachalam | |
| 8,316,237 B1* | 11/2012 | Felsher ................ | H04L 9/0825 |
| | | | 380/282 |
| 8,423,466 B2* | 4/2013 | Lanc ...................... | G06Q 20/32 |
| | | | 705/44 |
| 8,781,957 B2* | 7/2014 | Jackson ................ | G06Q 20/10 |
| | | | 235/375 |
| 9,311,630 B2* | 4/2016 | Jackson ................ | G06Q 20/10 |
| 9,947,002 B2* | 4/2018 | Toomer ................ | G06Q 20/20 |
| 2001/0044787 A1 | 11/2001 | Shwartz et al. | |
| 2001/0045451 A1 | 11/2001 | Tan et al. | |
| 2001/0047335 A1* | 11/2001 | Arndt ..................... | G06Q 20/04 |
| | | | 705/44 |
| 2002/0002538 A1 | 1/2002 | Ling | |
| 2002/0062281 A1* | 5/2002 | Singhal .................. | G06Q 20/02 |
| | | | 705/39 |
| 2002/0091646 A1* | 7/2002 | Lake ...................... | G06Q 20/04 |
| | | | 705/67 |
| 2002/0103768 A1* | 8/2002 | Rado ...................... | G06Q 20/04 |
| | | | 705/75 |
| 2002/0128965 A1* | 9/2002 | Sacal Y Micha ...... | G06Q 20/04 |
| | | | 705/39 |
| 2002/0147663 A1 | 10/2002 | Walker et al. | |
| 2002/0152179 A1 | 10/2002 | Racov | |
| 2003/0023549 A1* | 1/2003 | Armes .................... | G06Q 20/02 |
| | | | 705/40 |
| 2003/0061170 A1* | 3/2003 | Uzo ........................ | G06Q 20/06 |
| | | | 705/64 |
| 2003/0126094 A1 | 7/2003 | Fisher et al. | |
| 2004/0019564 A1 | 1/2004 | Goldthwaite et al. | |
| 2004/0172368 A1* | 9/2004 | Johnson ................ | G06Q 20/00 |
| | | | 705/64 |
| 2004/0190696 A1 | 9/2004 | Fleischer, III et al. | |
| 2005/0027543 A1* | 2/2005 | Labrou .................. | G06Q 20/02 |
| | | | 705/26.35 |
| 2005/0097060 A1 | 5/2005 | Lee | |
| 2005/0125342 A1 | 6/2005 | Schiff | |
| 2005/0256802 A1 | 11/2005 | Ammermann et al. | |
| 2005/0278226 A1 | 12/2005 | Morris | |
| 2006/0020542 A1* | 1/2006 | Litle ....................... | G06Q 10/10 |
| | | | 705/40 |
| 2006/0056608 A1 | 3/2006 | Crockett et al. | |
| 2006/0080545 A1 | 4/2006 | Bagley | |
| 2006/0089906 A1* | 4/2006 | Rowley .................. | G06Q 20/02 |
| | | | 705/40 |
| 2006/0106699 A1 | 5/2006 | Hitalenko et al. | |
| 2006/0116892 A1 | 6/2006 | Grimes et al. | |
| 2006/0167829 A1 | 7/2006 | Dreyfus | |
| 2006/0224470 A1* | 10/2006 | Garcia Ruano ........ | G06Q 20/04 |
| | | | 705/26.1 |
| 2006/0242058 A1* | 10/2006 | Torto ..................... | G06Q 20/02 |
| | | | 705/39 |
| 2006/0278704 A1* | 12/2006 | Saunders ............... | G06Q 20/10 |
| | | | 235/382 |
| 2007/0022019 A1* | 1/2007 | Sherwin ................ | G06Q 20/12 |
| | | | 705/26.35 |
| 2007/0064622 A1 | 3/2007 | Bi et al. | |
| 2007/0088952 A1 | 4/2007 | Hewit | |
| 2007/0125838 A1 | 6/2007 | Law | |
| 2007/0136211 A1* | 6/2007 | Brown .................. | G07F 7/1083 |
| | | | 705/75 |
| 2007/0158413 A1 | 7/2007 | Hastle | |
| 2007/0170247 A1* | 7/2007 | Friedman ............... | G06Q 20/40 |
| | | | 235/380 |
| 2007/0260555 A1* | 11/2007 | Ho ......................... | G06Q 20/24 |
| | | | 705/75 |
| 2008/0046363 A1 | 2/2008 | Ali et al. | |
| 2008/0059375 A1 | 3/2008 | Abifaker | |

(56) References Cited

U.S. PATENT DOCUMENTS

| | | |
|---|---|---|
| 2008/0089491 A1 | 4/2008 | Kortum et al. |
| 2008/0089503 A1 | 4/2008 | Crockett et al. |
| 2008/0103923 A1 | 5/2008 | Rieck |
| 2008/0103972 A1 | 5/2008 | Lanc |
| 2008/0167961 A1 | 7/2008 | Wentker et al. |
| 2008/0208697 A1* | 8/2008 | Kargman ............ G06Q 20/204 705/17 |
| 2008/0283591 A1 | 11/2008 | Oder, II |
| 2009/0012901 A1 | 1/2009 | Singh et al. |
| 2009/0104888 A1 | 4/2009 | Cox |
| 2009/0240620 A1* | 9/2009 | Kendrick ............ G06Q 20/12 705/39 |
| 2009/0327145 A1 | 12/2009 | Dent et al. |
| 2010/0020946 A1* | 1/2010 | Jackson ............ G06Q 20/10 379/88.04 |
| 2010/0030697 A1* | 2/2010 | Goodrich ............ G06Q 20/027 705/75 |
| 2010/0262542 A1* | 10/2010 | Kranzley ............ G06Q 20/40 705/44 |
| 2011/0093391 A1 | 4/2011 | Singhal |
| 2011/0302081 A1 | 12/2011 | Saunders et al. |
| 2012/0078791 A1 | 3/2012 | Huang et al. |
| 2012/0078799 A1* | 3/2012 | Jackson ............ G06Q 20/10 705/67 |
| 2012/0330828 A1 | 12/2012 | Neff |
| 2014/0025580 A1* | 1/2014 | Bacastow ............ G06Q 20/027 705/44 |
| 2014/0289124 A1* | 9/2014 | Jackson ............ G06Q 20/10 705/44 |
| 2014/0289125 A1* | 9/2014 | Killian ............ G06Q 20/0855 705/44 |
| 2016/0180340 A1* | 6/2016 | Jackson ............ G06Q 20/10 705/67 |
| 2017/0109663 A1* | 4/2017 | Barrett ............ G06Q 20/28 |

OTHER PUBLICATIONS

"Obopay Mobile Payment Service", An Innovative Electronic Payment System for Mobile Users, (Nov. 2005).

Payments News, "Obopay Mobile Payments—A First Look", retrieved from the internet at paymentsnews.com/2206/04/obopay_mobile_p on Oct. 17, 2007.

* cited by examiner

SECURE PAYMENT SERVICE AND SYSTEM FOR INTERACTIVE VOICE RESPONSE (IVR) SYSTEMS

CROSS-REFERENCE TO RELATED APPLICATIONS

The present application is a continuation application of U.S. patent application Ser. No. 14/297,658, filed on Jun. 6, 2014, which is a continuation of U.S. patent application Ser. No. 13/307,982, filed on Nov. 30, 2011, now U.S. Pat. No. 8,781,957, which is a continuation of U.S. patent application Ser. No. 12/179,029, filed on Jul. 24, 2008, now U.S. Pat. No. 8,090,650, the contents of which are expressly incorporated by reference herein in their entireties.

FIELD OF THE INVENTION

The present disclosure relates generally to an electronic payment service or system, and more particularly to an electronic payment service or system that allows a secure payment to be made to a participating merchant interactive voice response system.

BACKGROUND OF THE INVENTION

An interactive voice response system, which is sometimes referred to as a Call Tree, includes both hardware and a software application that accepts a combination of voice telephone input and/or touch-tone keypad selection and provides appropriate responses. An interactive voice response system is usually a part of a larger application that includes database access.

Merchant interactive voice response systems are generally not designed to handle secure electronic payments without the intervention of a human, who actually takes the order and queries the caller for payment or credit card information. Customers commonly issue authorizations to merchants over the telephone, but the process is relatively slow, cumbersome and relatively expensive due to the cost of live customer service employees and the amount of information involved. The customer service employees typically prompt customers for many pieces of information such as credit card numbers, expiration dates, security code, name on the credit card, credit card billing address, telephone number, etc. The obtained information must then be manually entered into a computer system, thereby contributing to the slowness and expense of the process.

SUMMARY OF THE DISCLOSURE

The present disclosure relates to a method, system, and computer readable medium for providing secure payments. An interactive voice response (IVR) system under the control of a merchant receives calls from at least one customer having a communications device. The merchant's interactive voice response system requests a payment from the customer, and the customer responds to the request by providing authentication information and payment amounts for a payment service. The payment service provides the customer with a token having a payment service ID number and a one time use transaction ID number. The customer provides the token information to the merchant's interactive voice response system which transmits the token information back to the payment service. The payment service issues an electronic payment or payment information to the merchant upon validation of the token information.

DETAILED DESCRIPTION

Figure 1A:
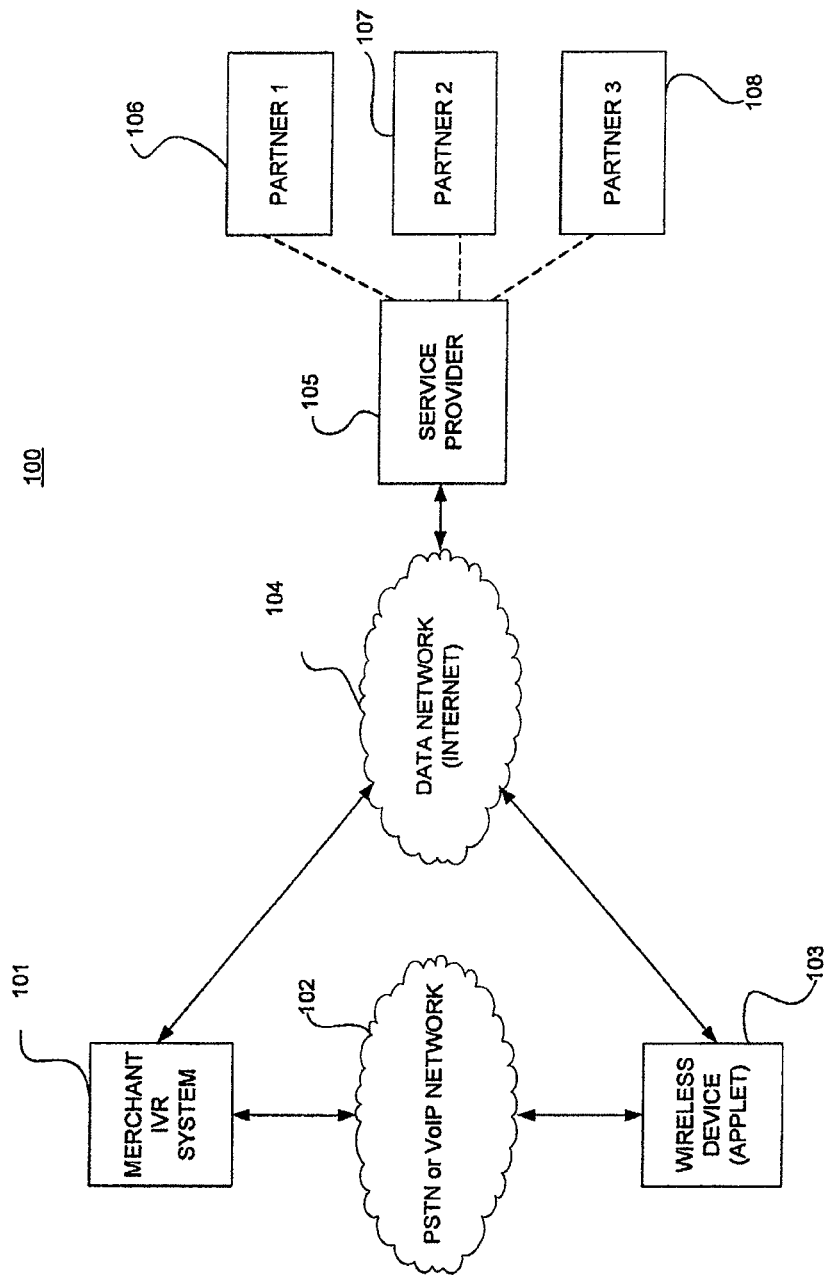
FIG. 1A is a block diagram of a secure payment system that includes a merchant's interactive voice response system.

In view of the foregoing, the present disclosure, through one or more of its various aspects, embodiments and/or specific features or sub-components, is thus intended to bring out one or more of the advantages as specifically noted below.

According to an aspect of the present disclosure, a secure payment method is implemented in conjunction with an interactive voice response (IVR) service under the control of a merchant for receiving calls from at least one customer having a communications device. The merchant's interactive voice response service requests a payment from the customer, and the merchant's interactive voice response service receives a response from the customer that includes authentication information and payment amounts for a payment service. The payment services provides the customer with a token having a payment service ID number token and a one time use transaction ID number token. The merchant's interactive voice response service receives the token information from the customer, and the merchant's interactive voice response service transmits the token information back to the payment service, which issues an electronic payment or payment information to the merchant upon validating the token information.

According to a further aspect of the present disclosure, the customer utilizes a communications device selected from the group comprising a cell phone, a personal computer, a PDA, an Internet appliance, a video game console, or a television set top box, to call the interactive voice response service.

According to a further aspect of the present disclosure, the communications device communicates with the merchant's interactive voice response service with either a wired or wireless link.

According to a further aspect of the present disclosure, the communications device establishes a link to the merchant's interactive voice response service via a PSTN or VoIP network.

According to a further aspect of the present disclosure, the communications device establishes a link to the payment service via a data network or the Internet.

According to a further aspect of the present disclosure, the payment service establishes a link to a financial partner that provides the payment service with electronic payment information.

According to a further aspect of the present disclosure, the merchant's interactive voice response service announces the completion of a successful transaction to the customer.

According to a further aspect of the present disclosure, an applet is installed on the communications device for communication with the payment service.

According to a further aspect of the present disclosure, the communications device communicates with the merchant's interactive voice response service using DTMF signaling.

According to a further aspect of the present disclosure, a secure payment system includes an interactive voice response server for receiving calls from at least one communications device. The interactive voice response server requests payment information from the communications device, and the interactive voice response server receives from the communications device authentication information and payment amounts for a payment service server. The payment service server provides the communications device with a token having a payment service ID number and a one time use transaction ID number. The interactive voice response server receives the token information from the communications device and transmits the token information back to the payment service server, which issues an electronic payment or payment information to the interactive voice response server upon validating the token information.

According to a further aspect of the present disclosure, the communications device is selected from the group comprising a cell phone, a personal computer, a PDA, an Internet appliance, a video game console, or a television set top box, to call the interactive voice response server.

According to a further aspect of the present disclosure, the communications device communicates with the merchant's interactive voice response server with either a wired or wireless link.

According to a further aspect of the present disclosure, the communications device establishes a link to the merchant's interactive voice response system via a PSTN or VoIP network.

According to a further aspect of the present disclosure, the communications device establishes a link to the payment service via a data network or the Internet.

According to a further aspect of the present disclosure, the payment system establishes a link to a financial partner.

According to a further aspect of the present disclosure, the merchant's interactive voice response server announces the completion of a successful transaction to the communications device.

According to a further aspect of the present disclosure, an applet is installed on the communications device for communication with the payment service server.

According to a further aspect of the present disclosure, the communications device communicates with the merchant's interactive voice response server using DTMF signaling.

According to a further aspect of the present disclosure, a computer readable medium for providing secure payments includes an interactive voice response server code segment for receiving calls from at least one communications device code segment. The interactive voice response server code segment requests payment information from the communications device code segment, and the interactive voice response server code segment receives from the communications device code segment the authentication information and payment amounts for a payment service server code segment. The payment service server code segment provides the communications device code segment with a token having a payment service ID number and a one time use transaction ID number. The interactive voice response server code segment receives from the communications device code segment the token information, and the interactive voice response server code segment transmits the token information back to the payment service server code segment, which issues an electronic payment or payment information to the interactive voice response server code segment upon validating the token information.

According to a further aspect of the present disclosure, the communications device code segment is executable on a cell phone, a personal computer, a PDA, an Internet appliance, a video game console, or a television set top box.

The secure payment system disclosed herein exploits the data capabilities of a customers' communications device, and particularly exploits data-capable cell phones. The secure payment system provides a mechanism for merchants to easily accept payments over an interactive voice response system without invoking customer service representatives. It furthermore allows customers of the merchant to issue payments with a few simple key presses from their data-capable cell phones.

FIG. 1A shows a block diagram for a secure payment system 100 of the present invention. The system 100 includes a merchant interactive voice response system 101 that a caller may access through the PSTN or VoIP network 102. Preferably, the user accesses the interactive voice response system 101 with a wireless device 103 or some other intelligent communications device (wireless or wired) that includes a software module such as an applet configured for use with the secure payment system 100. Both the interactive voice response system 101 and the wireless device 103 have access to a data network 104, such as the Internet, and the data network 104 provides the interactive voice response system 101 and wireless device 103 with access to a service provider/payment provider 105 and its partners 106-108. The service provider/payment service 105 may be an organization such as AT&T®, and the partners 106-108 could include companies such as VISA®, Mastercard®, Paypal® and Verisign®. In another embodiment, service provider 105 may not exist as a separate entity independent of partners 106, 107 and 108. In other words, partners 106, 107 and 108 may perform the functions of the service provider 105, may be directly connected to the data network 104 and may communicate directly with the merchant interactive voice response system 101 and wireless device 103. An applet is used herein to demonstrate an embodiment of a software module that may reside on device 103, but any suitable software module type may be used. It should be noted, that, if an independent service provider 105 is not included in the overall system of FIG. 1A, the target partners 106, 107 or 108 may be uniquely identified using any combinations of physical keys, soft keys and menus.

In order to utilize and participate in the secure payment system 100, the caller or customer must first have or download an applet on to the wireless device 103 or intelligent communications device. The applet is preferably password protected or protected by a biometric information input device, in case the wireless device 103 is lost or stolen. The user may also store payment information, such as credit card information or bank information, in order to avoid the repetitious entry of data and to enhance the rapid transfer of financial information to the system.

Figure 1B:
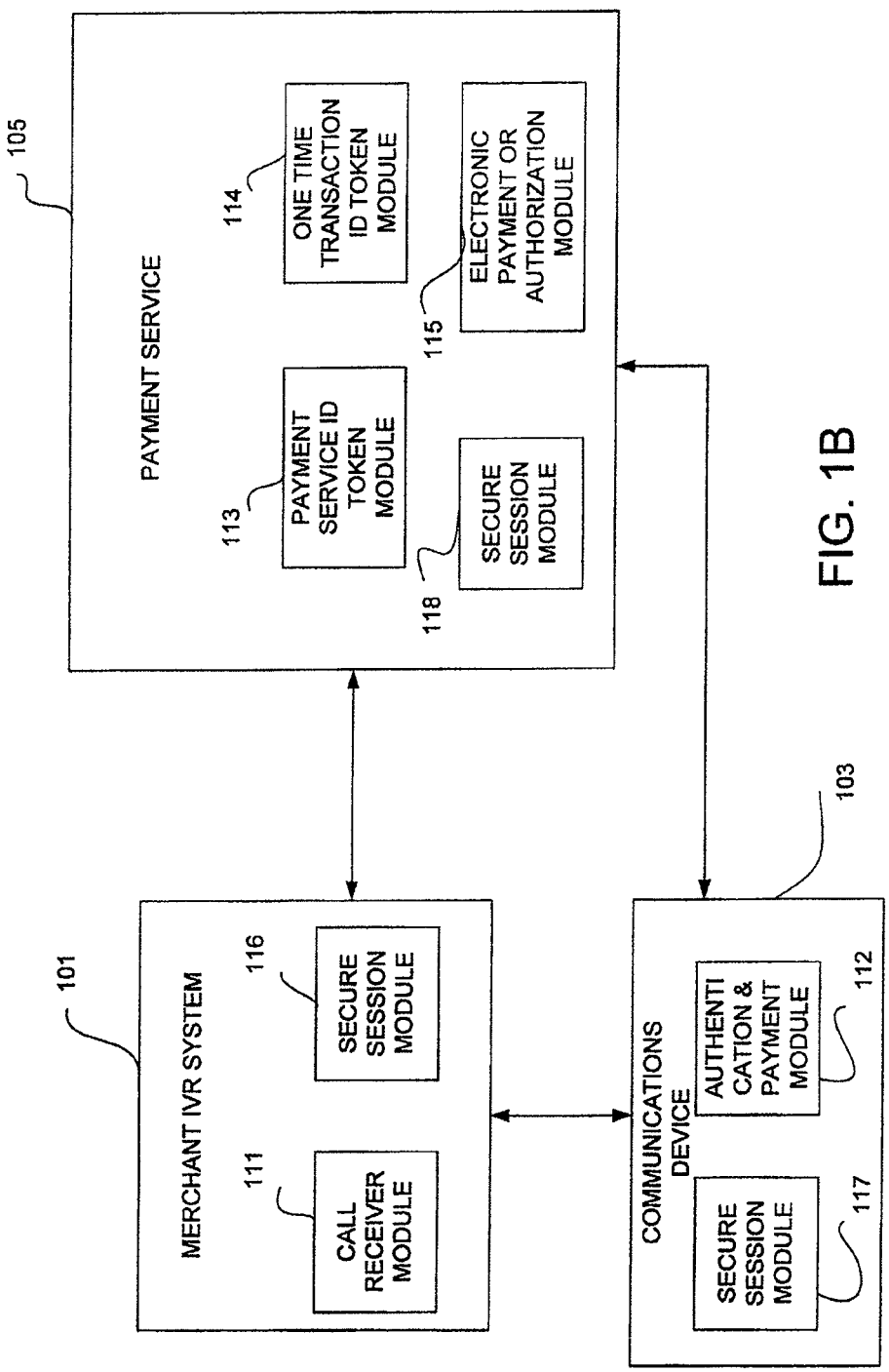
FIG. 1B is a more detailed block diagram of the interactive voice response system, communication device and payment service.

FIG. 1B shows the interactive voice response system 101, communications device 103 and payment service 105 in more detail. The interactive voice response system 101 which is under the control of a merchant includes a call receiver module 111 for receiving calls from at least one customer having a communications device 103. The merchant's interactive voice response service system 101 requests a payment from the customer, and the customer responds by providing authentication information and payment amounts to the payment service 105 from an authorization and payment amount module 112. In order to transmit the authorization and payment amounts, secure sessions modules 117, 118 are utilized to setup a secure session between the communications device 103 and the payment service 105. The payment service 105 provides the customer's communications device 103 with a token having a payment service ID number token and a one time use transaction ID number token. The payment service ID number is provided by a payment service ID number module 113, and the one time use ID token number is provided by a one time use ID token number module 114. The customer's communications device 103 provides the token information to the merchant's interactive voice response system 101 which transmits the token information back to the payment service 105 utilizing secure session module 116. The payment service 105 issues an electronic payment or payment information to the merchant from an electronic payment and authorization module 115, upon validating the token information.

Figure 2:
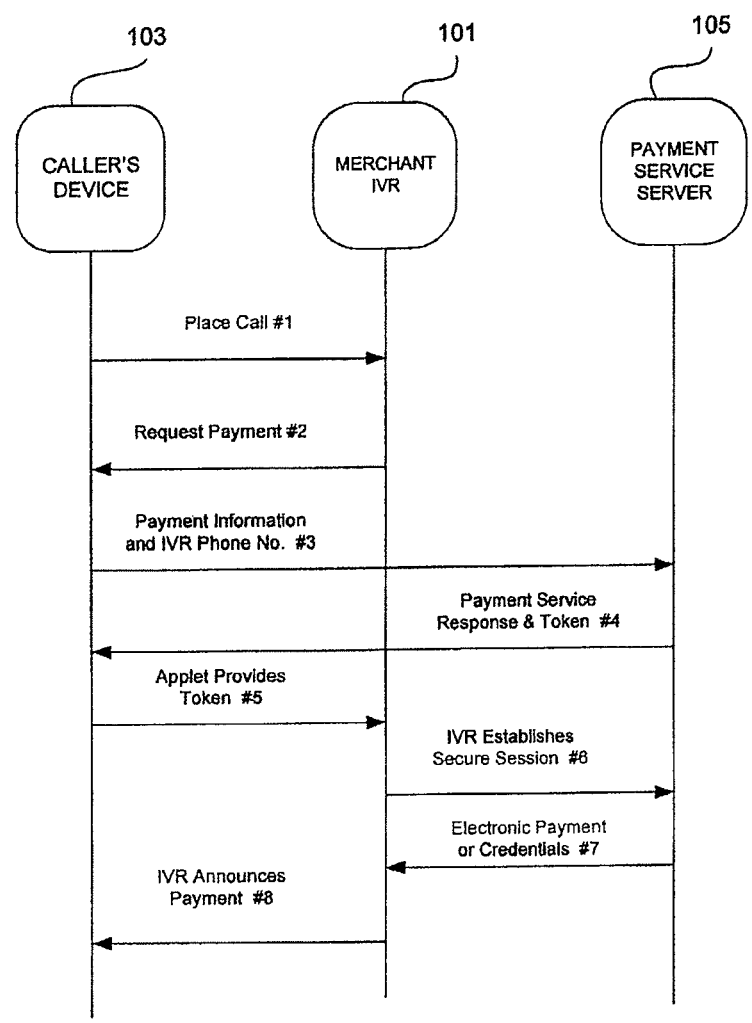
FIG. 2 an activity diagram for the secure payment system and merchant interactive voice response system of FIGS. 1A and 1B.

FIG. 2 shows an activity diagram for the secure payment system 100 and the merchant interactive voice response system 101 of FIGS. 1A and 1B. After the customer has had the relatively simple applet installed on his wireless device 103, and after the customer has entered the appropriate identification data and payment information for the first time, the customer is ready to place a telephone call to the merchant system 101 as indicated in step #1. As mentioned above, the preferred wireless device 103 is a data capable cell phone, but any wired or wireless intelligent communications device can be utilized, including a personal computer, PDA, Internet appliance, video game console, television set top box, etc. The call of step #1 links the caller's device 103 to the merchant interactive voice response system 101 and allows the customer to interact with the merchant's interactive voice response system 101 using key presses and DTMF signaling as is customary in the art.

After the customer has indicated to the merchant interactive voice response system 101 that the customer wants to purchase the merchant's products or services, the interactive voice response system 101 requests payment information from the caller's device 103 in step #2. The interactive voice response system 101 also indicates to the customer that it will accept a secure payment from the customer using the service provider's payment service 105. In response to the request for payment information, the customer in step #3 presses a payment key on his wireless device 103. The payment key may be a dedicated key labeled "PAY", a softkey or even one of the keys present on a conventional keypad. At this point, the applet on the wireless device 103 prompts the user to enter a password or PIN. Alternatively, the customer can be prompted to provide biometric information such as identity authentication information via a finger printer reader, a voice recognition device or an iris recognition device. The identify authentication information can be converted into a PIN. The applet also prompts the customer to enter a monetary amount, which can be entered via a keyboard or a voice input. Lastly, the applet provides the communications address, i.e., in this embodiment the telephone number of the interactive voice response system 101 (which is extracted from the current call), the PIN and the monetary amount to the payment service 105 via a secure session (for example, SSL) over the data network 104.

In step #4, the payment service 105 validates the PIN, and responds with a numeric token containing a payment service ID number and a one-time use transaction ID number. The numeric token is communicated back to the wireless device 103 via the data network 104. In step #5, the wireless device 103 plays out the numeric token to the merchant interactive voice response system 101 using DTMF signaling in the original voice call set up over the PSTN or VoIP network 102. In response to the DTMF signals provided by the wireless device 103, the interactive voice response system 101 in step #6 looks up the URL for the payment service 105 based on the payment service ID provided, and the interactive voice response system 101 establishes a secure session (for example, SSL) to the payment service 105 via the data network 104. The interactive voice response system 101 also provides the payment service 105 with the one-time use transaction ID. Reference is made to numeric IDs and tokens in this document to illustrate particular implementations using digits only. But, the same mechanism can be utilized with various alphanumeric encodings and alphanumeric tokens.

In step #7, the payment service verifies that the merchant interactive voice response system 101 requesting payment corresponds to the telephone number provided in the initial request. Such a request avoids issues in which the transaction ID may have been compromised on the PSTN or VoIP connection. The payment service 105 validates the one time use transaction ID, and either issues an electronic payment or provides the appropriate credentials (for example, credit card information, address etc. to the merchant interactive voice response system 101). Lastly, in step #8 the interactive voice response system 101 announces to the customer that payment has been received from the payment service 105.

Figure 3:
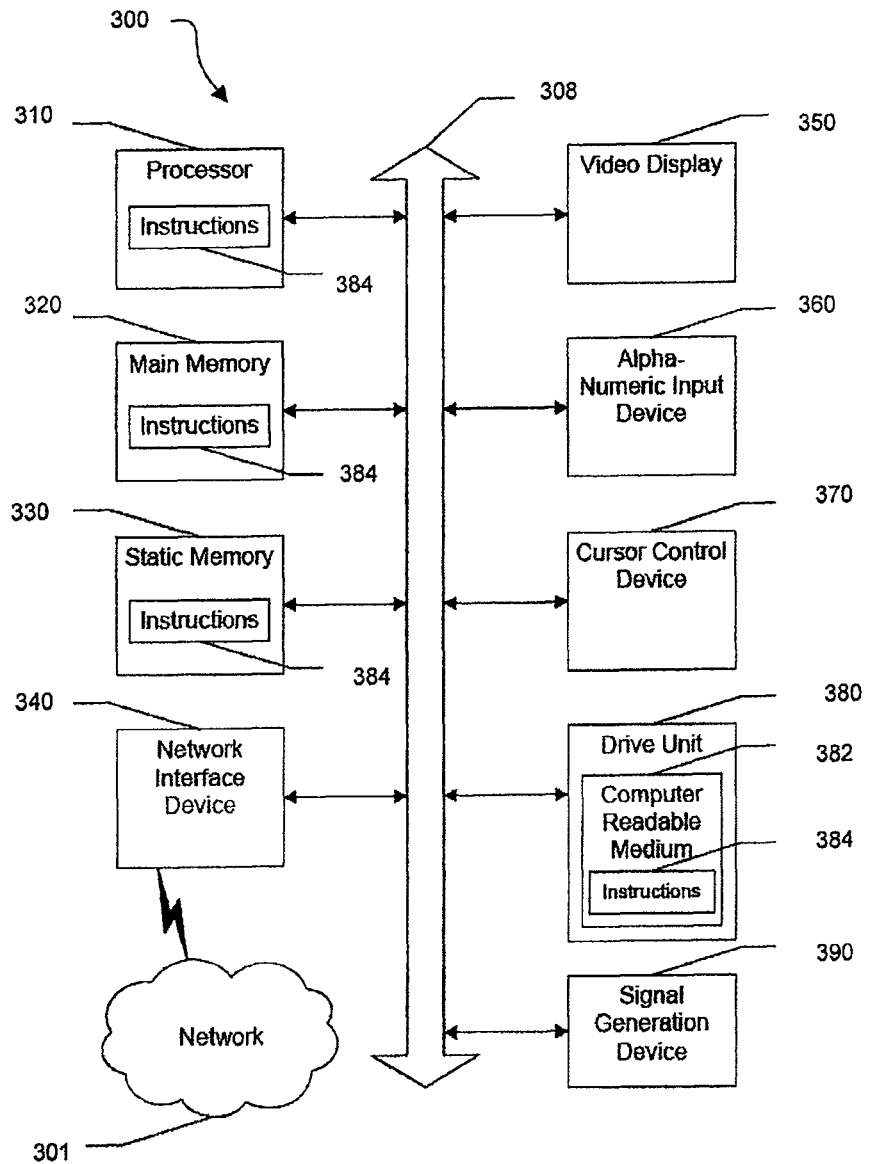
FIG. 3 is a block diagram of a computer system that can be used to implement various embodiments disclosed herein.

FIG. 3 shows an illustrative embodiment of a general computer system, on which secure payment system 100 can be implemented and is designated 300. The secure payment system 100 is preferably implemented using a plurality of computers 300. For example, the merchant interactive voice response system 101, wireless device 103 and payment service 105 all include one or more suitably programmed computer systems 300. The computer system 300 includes a set of instructions 384 that can be executed to cause the computer system 300 to perform any one or more of the methods or computer based functions disclosed herein. The computer system 300 may operate as a standalone device or may be connected, e.g., using a network 301, to other computer systems or peripheral devices.

As illustrated in FIG. 3, the computer system 300 may include a processor 310, e.g., a central processing unit (CPU), a graphics processing unit (GPU), or both. Moreover, the computer system 300 can include a main memory 320 and a static memory 330 that can communicate with each other via a bus 308. As shown, the computer system 300 may further include a video display unit 350, such as a liquid crystal display (LCD), an organic light emitting diode (OLED), a flat panel display, a solid state display, or a cathode ray tube (CRT). Additionally, the computer system 300 may include an input device 360, such as a keyboard, and a cursor control device 370, such as a mouse. The computer system 300 can also include a disk drive unit 380, a signal generation device 390, such as a speaker or remote control, and a network interface device 340.

In a networked deployment, the computer system 300 may operate in the capacity of a server or as a client user computer in a server-client user network environment, or as a peer computer system in a peer-to-peer (or distributed) network environment. The computer system 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 300 can be implemented using electronic devices that provide voice, video or data communication. Further, while a single computer system 300 is illustrated, the term "system" shall also be taken to include any collection of systems or sub-systems that individually or jointly execute a set, or multiple sets, of instructions to perform one or more computer functions.

In a particular embodiment, as depicted in FIG. 3, a disk drive unit 380 may include a computer-readable medium 382 in which one or more sets of instructions 384, e.g. software, can be embedded. Further, the instructions 384 may embody one or more of the methods or logic as described herein. In a particular embodiment, the instructions 384 may reside completely, or at least partially, within the main memory 320, the static memory 330, and/or within the processor 310 during execution by the computer system 300. The main memory 320 and the processor 310 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 382 that includes instructions 384 or receives and executes instructions 384 responsive to a propagated signal, so that a device connected to a network 301 can communicate voice, video or data over the network 301. Further, the instructions 384 may be transmitted or received over the network 301 via the network interface device 340.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

There are several advantages that the secure electronic payment system provides over conventional systems. For example, the secure electronic payment system reduces a merchant's operational costs by allowing payments to be processed without involving a customer service representative. The system encourages customers to make payments by phone, since the customer only has to make a few keypresses, and the process takes less time than to talking to a live customer service representative. The system can be added relatively easily to a communications company's existing infrastructure without substantial modification of the existing infrastructure. Lastly, the system can be implemented with a high level of security through the use of secure data sessions (for example, SSL), PIN based or biometric based authentication, one time use transaction ID's, and validation of the mapping of an interactive voice response called number to the actual merchant requesting payment.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather, the disclosure extends to all functionally equivalent structures, methods, and uses such as are within the scope of the appended claims.

We claim:

1. A secure payment method, comprising:
receiving, by a payment recipient computer, a transaction request from a party in a transaction;
requesting, by the payment recipient computer, a payment that is in a specified form and that is uniquely identified by a unique identification, wherein the payment that is in the specified form is dynamically generated based on the transaction request;
receiving, at the payment recipient computer for settlement of payment, the payment that is in the specified form, wherein the payment that is in the specified form is uniquely identified by the unique identification; and
authorizing, by the payment recipient computer, the transaction in response to receiving the payment that is in the specified form and that is uniquely identified by the unique identification,
wherein the specified form is issued by a private third party, and
wherein the specified form is different from a credit card.

2. The secure payment method of claim 1,
wherein the unique identification that uniquely identifies the payment that is in the specified form is issued by the private third party.

3. The secure payment method of claim 1,
wherein the specified form is electronic information.

4. The secure payment method of claim 1,
wherein the private third party is a payment service provider.

5. The secure payment method of claim 1,
wherein the transaction is for a purchase of a product.

6. The secure payment method of claim 1,
wherein the transaction is for a purchase of a service.

7. The secure payment method of claim 1,
wherein the payment that is in the specified form is received from the party.

8. The secure payment method of claim 7,
wherein the payment that is in the specified form is received by the payment recipient computer from the party independent of the private third party.

9. The secure payment method of claim 7,
wherein the party obtains the payment that is in the specified form from the private third party and provides the payment that is in the specified form to the payment recipient computer.

10. The secure payment method of claim 1,
wherein the unique identification is a one time use transaction identification.

11. The secure payment method of claim 1, further comprising:
exchanging the payment that is in the specified form for a specified monetary amount.

12. The secure payment method of claim 1, further comprising:
confirming, by the payment recipient computer, the unique identification with the private third party.

13. The secure payment method of claim 12, further comprising:
authorizing the transaction after confirming the unique identification with the private third party.

14. The secure payment method of claim 1, further comprising:
providing, from the payment recipient computer, the unique identification to the private third party for validation; and
receiving, by the payment recipient computer, the unique identification from the party independent of the private third party.

15. The secure payment method according to claim 1,
wherein the party uses a communications device to communicate with both the payment recipient computer and the private third party in order to provide the payment that is in the specified form to the payment recipient computer.

16. The secure payment method according to claim 1,
wherein the payment recipient computer communicates with the party while the private third party provides the unique identification to the party.

17. The secure payment method according to claim 15,
wherein the payment recipient computer provides the unique identification to the private third party while the payment recipient computer communicates with the party.

18. The secure payment method according to claim 1,
wherein the specified form comprises an electronic token.

19. A tangible non-transitory computer readable storage medium that stores a computer program for providing secure payments, the computer program, when executed by a processor, causing a computer apparatus to perform a process comprising:

receiving, on behalf of a payment recipient computer for settlement of payment, a payment that is in a specified form, wherein the payment that is in the specified form is uniquely identified by a unique identification; and authorizing a transaction in response to receiving the payment that is in the specified form and that is uniquely identified by the unique identification, wherein the payment recipient computer receives a transaction request from a party in the transaction, and requests the payment that is in the specified form and that is uniquely identified by the unique identification, prior to the computer apparatus receiving the payment that is in the specified form and that is uniquely identified by the unique identification, wherein the payment that is in the specified form and uniquely identified by the unique identification is dynamically generated based on the transaction request, wherein the specified form is issued by a private third party, and wherein the specified form is different from a credit card.

20. A computer apparatus, comprising:

a memory that stores instructions for securing payments, and a processor that executes the instructions, wherein, when executed by the processor, the instructions cause the processor to perform operations comprising:

receiving, on behalf of a payment recipient computer for settlement of payment, a payment that is in a specified form, wherein the payment that is in the specified form is uniquely identified by a unique identification; and authorizing a transaction in response to receiving the payment that is in the specified form and that is uniquely identified by the unique identification, wherein the payment recipient computer receives a transaction request from a party in the transaction, and requests the payment that is in the specified form and that is uniquely identified by the unique identification, prior to the computer apparatus receiving the payment that is in the specified form and that is uniquely identified by the unique identification, wherein the payment that is in the specified form and uniquely identified by the unique identification is dynamically generated based on the transaction request, wherein the specified form is issued by a private third party, and wherein the specified form is different from a credit card.

\* \* \* \* \*

UNITED STATES PATENT AND TRADEMARK OFFICE
CERTIFICATE OF CORRECTION

PATENT NO. : 10,269,015 B2  
APPLICATION NO. : 15/061227  
DATED : April 23, 2019  
INVENTOR(S) : Jackson et al.

Page 1 of 1

It is certified that error appears in the above-identified patent and that said Letters Patent is hereby corrected as shown below:

On the Title Page

In Line 2 of the "(72) Inventors:", please change "Auston," to -- Austin, --.

Signed and Sealed this
Twenty-second Day of October, 2019

Andrei Iancu
*Director of the United States Patent and Trademark Office*